(12) United States Patent
Chang

(10) Patent No.: US 8,009,896 B2
(45) Date of Patent: Aug. 30, 2011

(54) COPLANARITY INSPECTION DEVICE FOR PRINTED CIRCUIT BOARDS

(75) Inventor: Chiu-Fang Chang, Hsinchu (TW)

(73) Assignee: King Yuan Electronics Co., Ltd., Hsinchi (TW)

( * ) Notice: Subject to any disclaimer, the term of this patent is extended or adjusted under 35 U.S.C. 154(b) by 844 days.

(21) Appl. No.: 12/073,285

(22) Filed: Mar. 4, 2008

(65) Prior Publication Data

US 2009/0110263 A1    Apr. 30, 2009

(30) Foreign Application Priority Data

Oct. 30, 2007    (TW) ................... 96140768 A

(51) Int. Cl.
*G06K 9/00* (2006.01)

(52) U.S. Cl. ........ 382/151; 382/103; 382/106; 382/141; 382/145; 382/147; 382/152; 348/86; 348/87; 348/94; 348/95; 700/114; 700/192

(58) Field of Classification Search .......... 382/141–152, 382/103, 106; 348/86–95, 125–134; 700/95–212
See application file for complete search history.

(56) References Cited

U.S. PATENT DOCUMENTS

| | | | | |
|---|---|---|---|---|
| 4,328,553 A | * | 5/1982 | Fredriksen et al. ...... | 356/139.04 |
| 4,615,590 A | * | 10/1986 | Alvarez et al. ................. | 359/556 |
| 4,707,734 A | * | 11/1987 | Labinger et al. ............... | 382/149 |
| 4,978,224 A | * | 12/1990 | Kishimoto et al. ............ | 356/394 |
| 5,392,502 A | * | 2/1995 | Freer ................................. | 29/52 |
| 5,644,245 A | * | 7/1997 | Saitoh et al. ............. | 324/750.18 |
| 6,820,508 B2 | * | 11/2004 | Lee ............................. | 73/864.91 |
| 2002/0083899 A1 | * | 7/2002 | Komeno et al. ............... | 118/730 |
| 2007/0237385 A1 | * | 10/2007 | Kato ............................. | 382/149 |

* cited by examiner

*Primary Examiner* — Bhavesh Mehta
*Assistant Examiner* — Daniel Zeilberger
(74) *Attorney, Agent, or Firm* — Bacon & Thomas, PLLC

(57) ABSTRACT

A coplanarity inspection device for a printed circuit board includes a base, a supporting disk, a driver, a printed circuit board, a light source, an image acquisition means, and a controller. The supporting disk is arranged on the base, and the driver rotates the supporting disk. The printed circuit board is placed on the supporting disk, and includes a to-be measured side facing downward. The light source projects light beams on the to-be measured side of the printed circuit board. The image acquisition means aims at a specific area of the to-be measured side for image acquisition. The controller is to control the driver, and to store image taken by the image acquisition means. As such, the coplanarity inspection device for a printed circuit board can be employed to inspect whether the coplanarity of the printed circuit board satisfies the standard of setting values in a certain range.

11 Claims, 3 Drawing Sheets

COPLANARITY INSPECTION DEVICE FOR PRINTED CIRCUIT BOARDS

BACKGROUND OF THE INVENTION

1. Field of the Invention

The present invention relates to a probe card coplanarity inspection tool, and more particularly, to a coplanarity inspection device adapted for printed circuit boards, with such a mechanism the manner using a round probe card for inspecting the flatness of printed circuit boards can be standardized.

2. Description of Related Art

Generally speaking, determination on good or bad round probe cards is based on the coplanarity of printed circuit boards. The so-called "coplanarity" refers, in short, to an overall level of the flatness of printed circuit boards. For example, in case the coplanarity of the printed circuit board is within a specific standard value, the probe welded to the printed circuit board will have a relatively good orthogonality on the printed circuit board and a good parallelity between the probes. The probe card made according to the printed circuit board will result in a probe having a good ground contact with the touched location of a measured element so as to obtain accurate measurement data. However, in case the coplanarity of the printed circuit board exceeds the specific standard value, the probe card made according to the printed circuit board cannot be sure of a good contact with the touched location of the measured element, and so accurate measurement data cannot be assured.

A conventional manner for measuring the coplanarity of a printed circuit board is that a granite base is taken as a horizontal basis, and a circular printed circuit board is placed thereabove, then a feeler gauge is used to measure to what extent the printed circuit board is curved against the granite base so as to calculate the coplanarity thereof. Because the measurement is proceeded through touching the printed circuit board with human hands, the coplanarity data thus obtained is questionable due to interference by man's factor. Therefore, it is an urge to develop a standardized measurement for a coplanarity inspection mechanism using a round probe card to accurately measure the flatness of printed circuit boards.

SUMMARY OF THE INVENTION

The present invention is to provide a coplanarity inspection device for a printed circuit board, comprising a base, a supporting disk, a driver, a printed circuit board, a light source, an image acquisition means, and a controller. The supporting disk is slidably arranged on the base, and that the driver rotates the supporting disk. The printed circuit board is placed on the supporting disk, and includes a to-be measured side. The light source is arranged above or under the supporting disk, and projects light beams on the to-be measured side of the printed circuit board. The image acquisition means is disposed at one side of the supporting disk, the same side as the light source is disposed at the supporting disk. The image acquisition means aims at a specific area of the to-be measured side for image acquisition. The controller is electrically coupled with the driver and the image acquisition means so as to control rotation of the driver, and to store image taken by the image acquisition means from the specific area of the to-be measured side. As such, the coplanarity inspection device for a printed circuit board can be employed to inspect whether the coplanarity of the printed circuit board satisfies the standard of setting values in a certain range.

The printed circuit board may be an alignment kit including an outer alignment flange and an inner alignment flange. The outer alignment flange has a height greater than that of the inner alignment flange. As such, the alignment kit can be used to make the unit pixel of a image acquisition means correspond to the actual unit dimensions of the inner alignment flange and the outer alignment flange. In addition, this printed circuit board may be designated as a to-be measured probe card printed circuit board. Thereafter, the controller may divide a to-be measured surface of the probe card printed circuit board into a plurality of specific angles, and when the controller rotates the supporting disk at one of the specific angles so as to pick up an image at the specific angle of the to-be measured surface with the help of the image acquisition means. Then the controller is employed to calculate whether the coplanarity of the plural specific angles satisfies the standard of setting values in a certain range.

Further, the driver can be a step motor, DC motor, servomotor, or an equivalent driver. The supporting disk is provided, around internal circumference thereof, with a tooth-ring for supporting the printed circuit board, and that a plurality of rollers are disposed underneath the supporting disk. Further, a tooth-disk is fixed to the driver, and that a tooth-ring is fixed to external circumference of the supporting disk. Therefore, the tooth-disk and the tooth-ring are engaged with each other so as to rotate the to-be measured printed circuit board.

Other objects, advantages, and novel features of the present invention will become more apparent from the following detailed descriptions when taken in conjunction with the accompanying drawings.

DETAILED DESCRIPTION OF THE PREFERRED EMBODIMENTS

Figure 1:
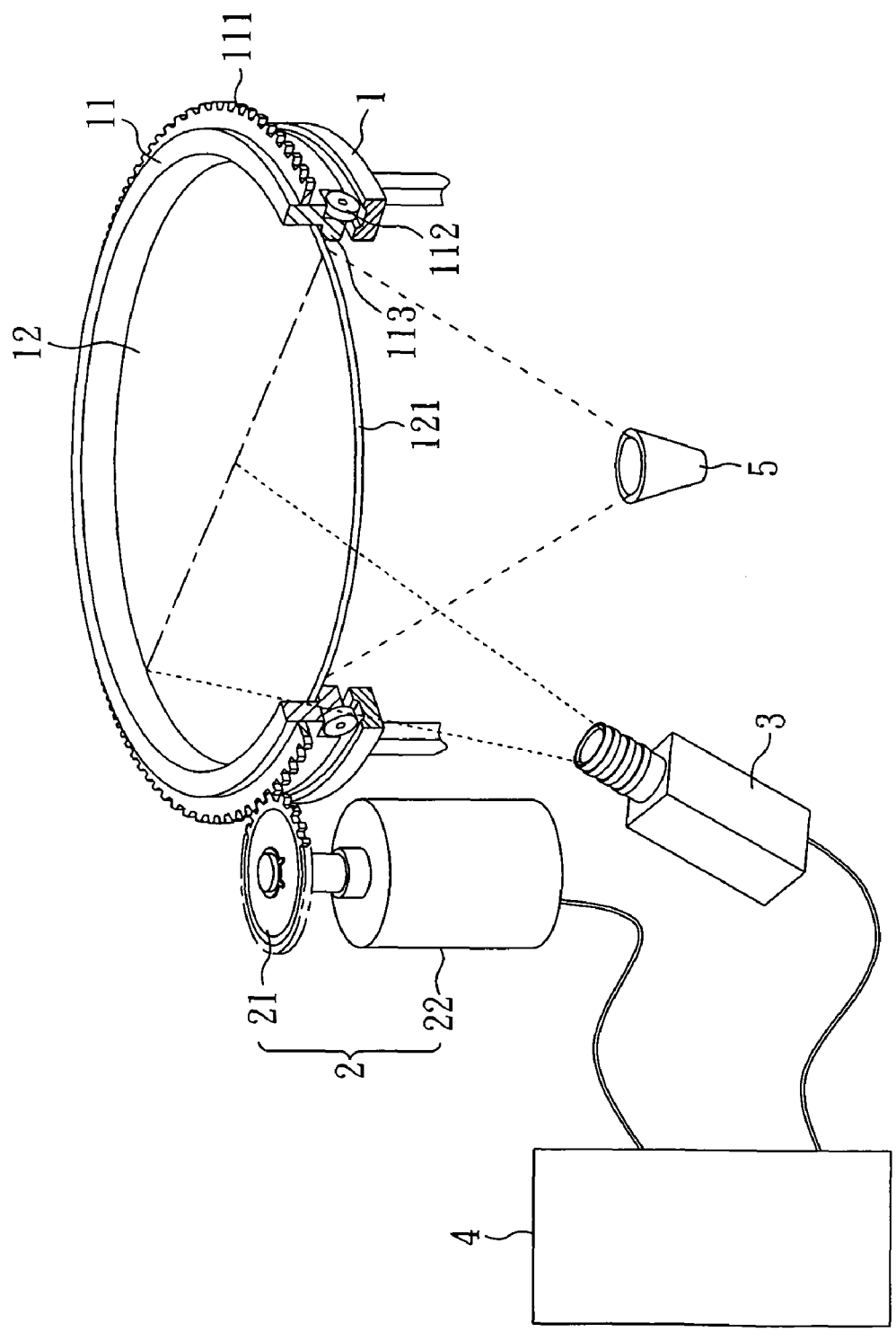
FIG. 1 is a perspective view illustrating a coplanarity inspection device according to the present invention.

Referring to FIG. 1, a coplanarity inspection device for a printed circuit board comprises a base 1, a supporting disk 11, a driver 2, a printed circuit board 12, a light source 5, an image acquisition means 3, and a controller 4.

In the present invention, the base 1 refers to a circular base, and the printed circuit board 12 to a circular printed circuit board 12. The supporting disk 11 is slidably arranged on the base 1, and is provided with a tooth-ring 111 around external circumference of the supporting disk 11, where a plurality of rollers 112 are pivotally disposed underneath the supporting disk 11. A supporting ring 113 is provided around internal circumference of the supporting disk 11, and that the printed circuit board 12 is placed on the supporting ring 113 so as to be positioned on the supporting disk 11.

The driver 2 includes a tooth-disk 21 and a motor 22, where the tooth-disk 21 is fixed to the motor 22. The tooth-disk 21 of the driver 2 is engaged with the tooth-ring 111 of the supporting disk 11, so that the supporting disk 11 can be driven by the motor 22 for rotation. The printed circuit board 12 is placed on the supporting disk 11, where the printed circuit board 12 has a to-be measured side 121 facing toward downside of the supporting disk 11.

In the present invention, the light source 5 refers to a spotlight arranged underneath the supporting disk 11, and that the spotlight projects light beams on the to-be measured side 121 of the printed circuit board 12, so that the image acquisition means 3 acquires the image of the to-be measured side 121.

According to the present invention, the image acquisition means 3 refers to a charge coupled device (CCD) disposed underneath the supporting disk 11, and that the image acquisition means 3 aims at a specific area of the to-be measured side 121 for image acquisition. The controller 4 is electrically coupled with the driver 2 and the image acquisition means 3 so as to control rotation of the motor 22 of the driver 2, and to store the image taken by the image acquisition means 3 from the specific area of the to-be measured side 121 of the printed circuit board 12.

Figure 2:
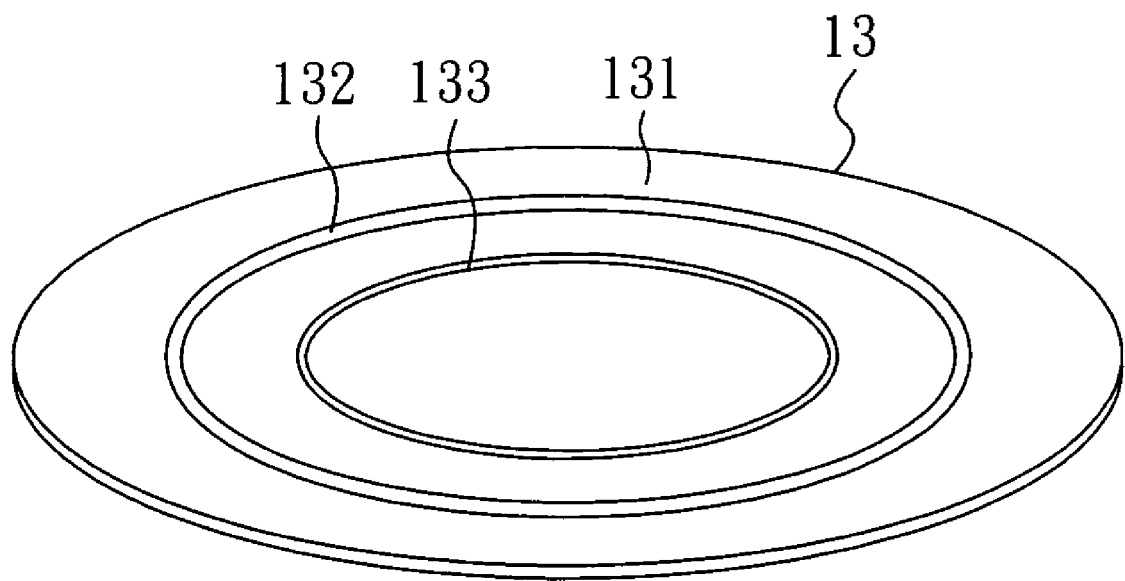
FIG. 2 is a schematic view illustrating an alignment kit of the coplanarity inspection device according to the present invention.

Referring now to FIG. 2, a schematic view illustrating an alignment kit 13 of the coplanarity inspection device according to the present invention, prior to inspecting the coplanarity of the printed circuit board 12, the alignment kit 13 is used as a basis for alignment of image measurement unit. The alignment is based on the alignment kit 13. The to-be measured side 131 of the alignment kit 13 includes an outer alignment flange 132 and an inner alignment flange 133. The outer alignment flange 132 has a height greater than that of the inner alignment flange 133.

Alignment may be proceeded with the steps as follows, in reference with FIG. 1: First, the image acquisition means 3 uses the to-be measured side 131 as a based surface, then picking up the height of the inner alignment flange 133 of the alignment kit 13. In case the pixel of the image acquisition means 3 corresponding to the height of the flange 133 is not an integral number, such that in the present invention the height of the inner alignment flange 133 is 0.05 mm and that the pixel of the flange 133 corresponding to the image acquisition means 3 is 4.5, then the pixel of the image acquisition means 3 should be adjusted to 5. Therefore, every pixel of the image acquisition means 3 corresponds to an actual height of 0.01 mm so as to facilitate calculation. This procedure is called a "rough tune."

When the rough tune is finished, the outer alignment flange 132 then becomes a target for alignment. In the present invention, the outer alignment flange 132 has a height of 0.1 mm. Thereafter, the image acquisition means 3 is employed to obtain a pixel for the height, and that the pixel actually obtained during the rough tune is taken as a basis, so as to compare if the actual height of the outer alignment flange 132 is correct. In case minor errors occur, then the outer alignment flange 132 is taken as a basis to repeat a tune so as to make the compared pixel become an integral multiple of the actual dimension. This stage is called a "fine tune." As such, every pixel of the image acquisition means 3 has a more accurate value.

Figure 3:
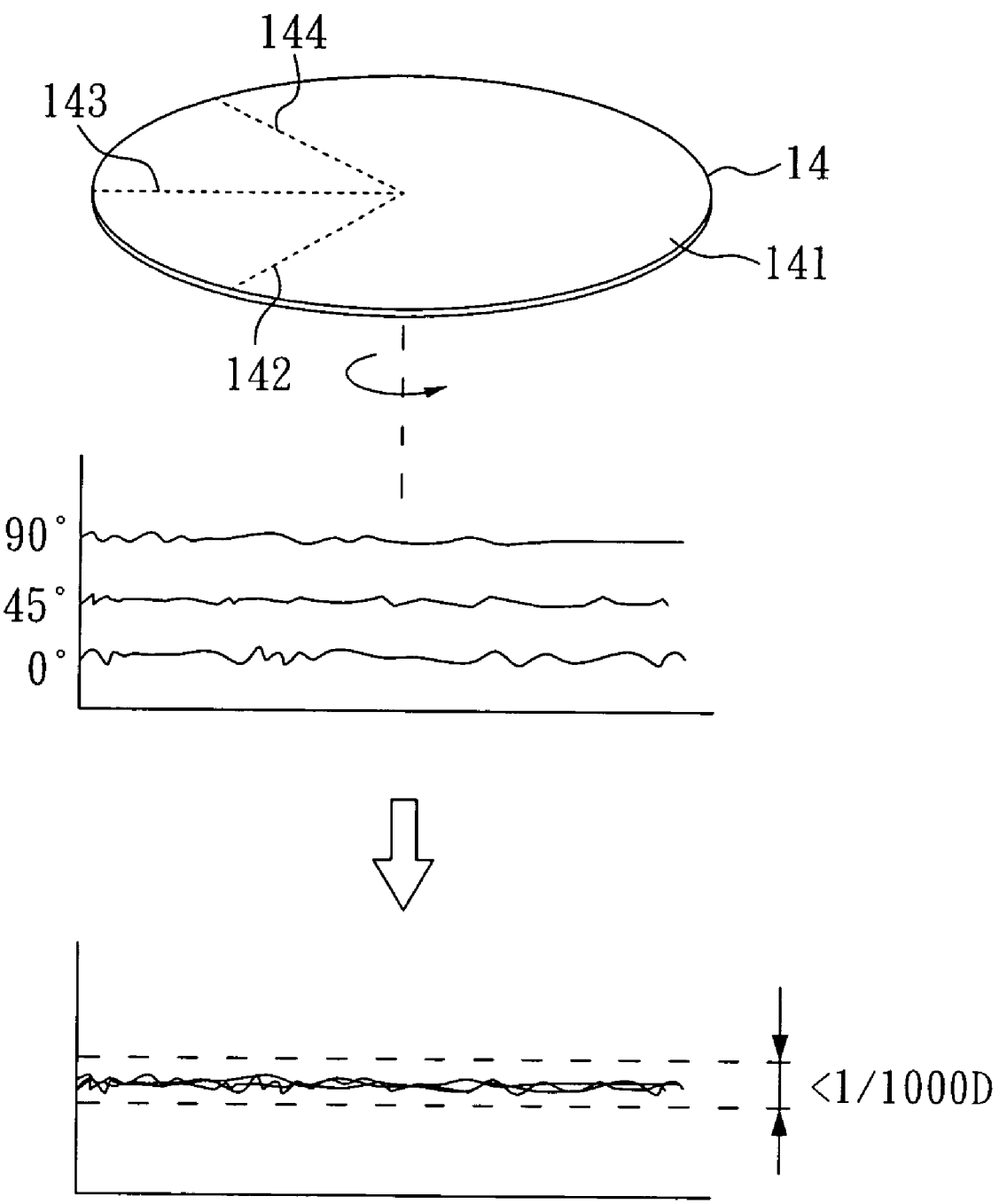
FIG. 3 is a schematic view illustrating performance of a coplanarity inspection device according to the present invention.

Further, referring to FIG. 3, a schematic view illustrating the performance of a coplanarity inspection according to the present invention, and to FIG. 1, when alignment given to the pixel of the image acquisition means 3 and the actual pixel has been finished, a to-be measured probe card printed circuit board 14 is placed on the coplanarity inspection device. At this moment, the controller 4 is set to divide a to-be measured surface 141 of the probe card printed circuit board 14 into a plurality of specific angles, such that 15°, 30°, or 45° may be defined as a specific angle for the probe card printed circuit board 14. In the present invention, the to-be measured surface 141 of the probe card printed circuit board 14 is divided every 45° for a segment as a basis for image taking, as defined with dotted lines 142, 143 and 144. The controller 4, through the driver 2, rotates the supporting disk 11 at one of the specific angles so as to pick up an image, through the image acquisition means 3, from the to-be measured surface 141 at one of the specific angles.

After the controller 4 has acquired numerical values of all the specific angles for the surface 141 of the probe card printed circuit board 14, the numerical values on the to-be measured surface 141 for all the angles must be less than $\frac{1}{1000}$D, wherein D stands for a diameter of the to-be measured probe card printed circuit board. In other words, the coplanarity of the to-be measured surface 141 must be less than $\frac{1}{1000}$D so as to satisfy requirement. In case the probe card printed circuit board 14 is less than $\frac{1}{1000}$D, such standard for inspection will be satisfied, and that a probe card can further be made. If, otherwise, the probe card printed circuit board 14 is greater than $\frac{1}{1000}$D, such standard of inspection will not be met, and should be eliminated.

Since the inspection process under the coplanarity inspection device for a printed circuit board according to the present invention will by no means operated through human hands, the problem of inaccurate measurement on coplanarity, due to interference by man's factor, through a conventional measurement for printed circuit boards using a feeler gauge can be greatly improved. Therefore, standard criteria can be provided for standardization for flatness measurement can be established.

Although the present invention has been explained in relation to its preferred embodiments, it is to be understood that many other possible modifications and variations can be made without departing from the scope of the invention as hereinafter claimed.

What is claimed is:

1. A coplanarity inspection device for a printed circuit board, comprising:
    a base;
    a supporting disk, being slidably arranged on the base;
    a driver, rotating the supporting disk;
    a printed circuit board which is an alignment kit including an outer alignment flange and an inner alignment flange, and wherein the outer alignment flange has a height greater than that of the inner alignment flange;
    said circuit board being placed on the supporting disk, and including a to-be measured side;
    a light source, being arranged at one side of the supporting disk, and projecting light beams on the to-be measured side of the printed circuit board;
    an image acquisition means, being disposed at one side of the supporting disk, and aiming at a specific area of the to-be measured side for image acquisition; and
    a controller, being electrically coupled with the driver and the image acquisition means so as to control rotation of the driver, and to store the image acquired by the image acquisition means from the specific area of the to-be measured side.

2. The coplanarity inspection device for a printed circuit board as claimed in claim 1, wherein the printed circuit board is a to-be measured probe card printed circuit board, and the controller is set to divide the to-be measured surface into a plurality of specific angles, and wherein the controller, through the driver, rotates the supporting disk at one of the specific angles so as to pick up an image, through the image acquisition means, from the to-be measured surface at the specific angle.

3. The coplanarity inspection device for a printed circuit board as claimed in claim 1, wherein a tooth-ring is provided at external circumference of the supporting disk, and a tooth-disk is fixed to the driver, and wherein the tooth-disk and the tooth-ring are engaged with each other.

4. The coplanarity inspection device for a printed circuit board as claimed in claim 1, wherein a plurality of rollers are disposed underneath the supporting disk.

5. The coplanarity inspection device for a printed circuit board as claimed in claim 1, wherein the supporting disk is provided, around internal circumference thereof, with a tooth-ring.

6. The coplanarity inspection device for a printed circuit board as claimed in claim 1, wherein the driver is a motor.

7. The coplanarity inspection device for a printed circuit board as claimed in claim 6, wherein the motor is a step motor.

8. The coplanarity inspection device for a printed circuit board as claimed in claim 1, wherein the image acquisition means is a charge coupled device (CCD).

9. The coplanarity inspection device for a printed circuit board as claimed in claim 1, wherein the light source is a spotlight.

10. The coplanarity inspection device for a printed circuit board as claimed in claim 1, wherein the base is a circular base.

11. The coplanarity inspection device for a printed circuit board as claimed in claim 1, wherein the printed circuit board is a circular printed circuit board.

\* \* \* \* \*